US009387756B1

United States Patent
Whiting et al.

(10) Patent No.: US 9,387,756 B1
(45) Date of Patent: Jul. 12, 2016

(54) VEHICLE HYBRID DRIVE ARRANGEMENT

(71) Applicants: Gary Ken Whiting, North East, MD (US); Hilary Paige Whiting, North East, MD (US)

(72) Inventors: Gary Ken Whiting, North East, MD (US); Hilary Paige Whiting, North East, MD (US)

(73) Assignee: Quanta Products LLC, Rising Sun, MD (US)

(*) Notice: Subject to any disclaimer, the term of this patent is extended or adjusted under 35 U.S.C. 154(b) by 132 days.

(21) Appl. No.: 14/527,340

(22) Filed: Oct. 29, 2014

Related U.S. Application Data

(60) Provisional application No. 61/898,447, filed on Oct. 31, 2013.

(51) Int. Cl.
| | |
|---|---|
| *B60K 6/52* | (2007.10) |
| *B60K 6/365* | (2007.10) |
| *B60W 20/00* | (2016.01) |
| *B60K 6/445* | (2007.10) |
| *B60W 10/08* | (2006.01) |
| *B60W 10/26* | (2006.01) |
| *F16H 48/06* | (2006.01) |
| *B60K 7/00* | (2006.01) |

(52) U.S. Cl.
CPC . *B60K 6/52* (2013.01); *B60K 6/365* (2013.01); *B60K 6/445* (2013.01); *B60W 10/08* (2013.01); *B60W 10/26* (2013.01); *B60W 20/10* (2013.01); *F16H 48/06* (2013.01); *B60K 2007/0046* (2013.01); *B60K 2007/0092* (2013.01); *Y10S 903/91* (2013.01); *Y10S 903/916* (2013.01)

(58) Field of Classification Search
CPC .............................................. B60K 2007/0046
See application file for complete search history.

(56) References Cited

U.S. PATENT DOCUMENTS

| | | | | |
|---|---|---|---|---|
| 2,561,335 | A * | 7/1951 | Buckendale | B60K 17/16 475/230 |
| 4,499,965 | A | 2/1985 | Oetting et al. | |
| 5,419,406 | A | 5/1995 | Kawamoto et al. | |
| 5,667,029 | A | 9/1997 | Urban et al. | |
| 5,755,302 | A | 5/1998 | Lutz et al. | |
| 6,295,487 | B1 * | 9/2001 | Ono | B60K 6/44 180/165 |
| 6,595,308 | B2 | 7/2003 | Bowen | |
| 6,808,033 | B2 * | 10/2004 | Dare-Bryan | B60G 3/145 180/24.07 |
| 7,118,119 | B2 * | 10/2006 | Amanuma | B60G 3/20 180/65.51 |
| 7,270,203 | B2 | 9/2007 | Hsu | |
| 7,410,017 | B2 | 8/2008 | Gradu | |
| 7,592,766 | B2 | 9/2009 | Patel et al. | |
| 7,984,777 | B2 * | 7/2011 | Kim | B60K 6/26 180/197 |
| 8,011,461 | B2 | 9/2011 | Rodriguez et al. | |
| 8,012,057 | B2 | 9/2011 | Meixner | |

(Continued)

*Primary Examiner* — Sherry Estremsky
(74) *Attorney, Agent, or Firm* — RatnerPrestia

(57) ABSTRACT

A hybrid drive arrangement for a motor vehicle comprising two close-coupled electric traction motors/generators on the output of the vehicle differential. A constant velocity joint coupling device is incorporated into the central axis of the traction motors between the differential output shafts and the independent articulated axle shafts for the drive wheels. One embodiment comprises a kit for retrofitting an existing vehicle. The kit comprises two electric traction motors/generators incorporating the constant velocity joint coupling devices, two devices for mounting the traction motors to each side of the differential case between the differential and the independent, articulated axle shafts of the existing vehicle, a battery system electrically coupled to the traction motors, two traction motor controllers, and a vehicle sensing and control system. The arrangement provides for improved acceleration, deceleration, cornering, ease of parking, and fuel economy.

27 Claims, 5 Drawing Sheets

(56) References Cited

U.S. PATENT DOCUMENTS

| | | | |
|---|---|---|---|
| 8,062,162 B2 | 11/2011 | Zöhrer | |
| 8,591,361 B2 | 11/2013 | Hisada et al. | |
| 8,591,369 B2 | 11/2013 | Palfai et al. | |
| 8,731,755 B2 | 5/2014 | Rauner | |
| 2005/0205313 A1* | 9/2005 | Gilmore | B60K 6/26 180/65.21 |
| 2006/0132085 A1 | 6/2006 | Loubeyre | |
| 2008/0236910 A1* | 10/2008 | Kejha | B60K 1/04 180/265 |
| 2010/0044129 A1 | 2/2010 | Kyle | |
| 2011/0259657 A1* | 10/2011 | Fuechtner | B60K 6/52 180/65.21 |
| 2012/0089283 A1 | 4/2012 | Rauner et al. | |
| 2012/0166028 A1 | 6/2012 | Füchtner | |
| 2013/0123057 A1 | 5/2013 | Märkl | |
| 2014/0066248 A1* | 3/2014 | Ochi | H02K 7/116 475/343 |
| 2014/0074335 A1 | 3/2014 | Krauss et al. | |
| 2014/0106928 A1 | 4/2014 | Rüger | |

* cited by examiner

VEHICLE HYBRID DRIVE ARRANGEMENT

CROSS REFERENCE TO RELATED APPLICATIONS

This application claims priority from U.S. Provisional Patent Application Ser. No. 61/898,447, filed Oct. 31, 2013, which is hereby incorporated by reference in its entirety.

BACKGROUND OF THE INVENTION

Historically, existing internal combustion engine vehicles have not been converted to hybrid vehicles because of the complexity and lack of space to incorporate the electric motors into the drivetrain. It is desired to be able to convert existing conventional vehicle designs to create hybrid electric vehicles. For example, it is desirable to improve the efficiency and performance of a rear-wheel drive vehicle by retrofitting the mechanical design to include independently controllable electric motors, an energy storage system, motor control units and a supplemental vehicle sensing and control unit. One such conventional design that may benefit from such a retrofit is a front engine, rear drive vehicle, more specifically a front internal combustion engine arrangement, having a transmission and a rear differential driving the rear wheels. The most direct route to providing electric power to these vehicles is to remove the internal combustion engine and sometimes the transmission. An electric motor is placed in the resulting empty front internal combustion engine bay and the electric motor is coupled in line to the existing rear differential. This approach adds significant weight to the vehicle due to the large battery packs and in some cases the large conventional electric motors that are necessary to duplicate the power and driving range of the internal-combustion-engine-driven vehicle. Further, the removal of the internal combustion engine results in the necessity to recharge the batteries from the electrical grid and limits the driving range and utility of the vehicle.

It is desirable to be able to utilize existing conventional internal combustion engine vehicle designs, for example front engine, rear drive designs, but to retrofit those designs in a robust way that results in efficient use of space while greatly improving the performance and efficiency of the vehicle. Further, it is desirable to retrofit existing vehicles with supplemental electric systems to produce efficient, high performance vehicles with extended driving range. Accordingly, there is a need for a vehicle hybrid drive arrangement for motor vehicles that allows existing conventional vehicle designs to be efficiently converted to hybrid electric vehicles. Furthermore, there is a need for a hybrid drive arrangement that allows for compact new vehicle designs that readily incorporate electric motors in a rear transaxle arrangement, while incorporating an independent suspension benefiting performance and efficiency.

SUMMARY OF THE INVENTION

One aspect of the invention relates to a hybrid electric vehicle comprising an arrangement of electric motors in a drivetrain to supplement a primary power source, such as an internal combustion engine, and that permits incorporation into a vehicle having an independent suspension.

One aspect of the invention comprises a vehicle hybrid drive arrangement comprising a primary power source, a primary power source power-engaging device, a primary power transmitting shaft; a transmission driven by the primary power source; a differential housed in a differential case, the differential comprising a gear set configured to be driven by the primary power source and for driving two differential output shafts; two independent, articulated axle shafts, each shaft configured to deliver power to a drive wheel, and two secondary power sources. Each secondary power source is disposed between the differential output shafts and the articulated axle shafts, and comprises a constant velocity joint coupling device disposed within a central axis of the secondary power source and configured to couple the secondary power source to the corresponding differential output shaft and to drive the corresponding articulated axle shaft. The secondary power sources may comprise electric traction motors, preferably electric traction motor/generators, and more preferably direct drive axial flux electric motors/generators. The primary power source may comprise an internal combustion engine or an electric motor. The secondary power sources may be configured to operate independently or in conjunction with the primary power source.

The vehicle hybrid drive arrangement may further comprise a battery system connected to the electric motors/generators, a vehicle sensing and control system, and one or more motor/generator controllers configured to control the electric motors/generators. The arrangement may be configured to operate the electric traction motors/generators as generators to recover energy from a moving vehicle and to store that energy in the battery system and/or to extract energy from the drive wheels to brake or slow a moving vehicle. The secondary power sources may be configured to operate in concert to pivot the vehicle at low speed to improve maneuverability to aid in parking and turning. For example, the arrangement may be configured to supplement power to each drive wheel independently, and/or to operate the electric traction motors/generators as generators to extract power from each drive wheel independently, to aid in turning the vehicle.

The constant velocity joint coupling device may be incorporated into a rotor of a corresponding secondary power source electric traction motor. The vehicle hybrid drive arrangement may be integrated into the independent suspension of a vehicle. In one embodiment, the system may be configured to launch the vehicle without stalling the internal combustion engine while the transmission is in a relatively high gear and the internal combustion engine is operating at relatively low revolutions per minute below a threshold value at which the internal combustion engine would stall in the relatively high gear without the assistance of the secondary power sources.

Another aspect of the invention comprises a hybrid electric vehicle powertrain kit for retrofitting an internal-combustion-engine-powered vehicle having a transmission, a differential having a differential case and two differential output shafts, and two independent, articulated axle shafts for delivering power from one of the differential output shafts to a drive wheel. In this aspect, the kit comprises two electric traction motors/generators, two differential case mounting devices, a battery system electrically coupled to the two electric traction motors; two motor/generator controllers, each for controlling one of the electric traction motor/generators; and a vehicle sensing and control system. The differential case mounting devices facilitate mounting one of the electric traction motor/generators to one side of the differential case between the differential and one of the independent, articulated axle shafts. Each electric traction motors/generator comprises a constant velocity joint coupling device configured to couple the electric traction motor/generator to a corresponding differential output shaft and a corresponding axle shaft. The secondary power sources preferably comprise direct drive axial flux electric motors/generators.

DETAILED DESCRIPTION OF THE INVENTION

Definitions

Figure 1A:
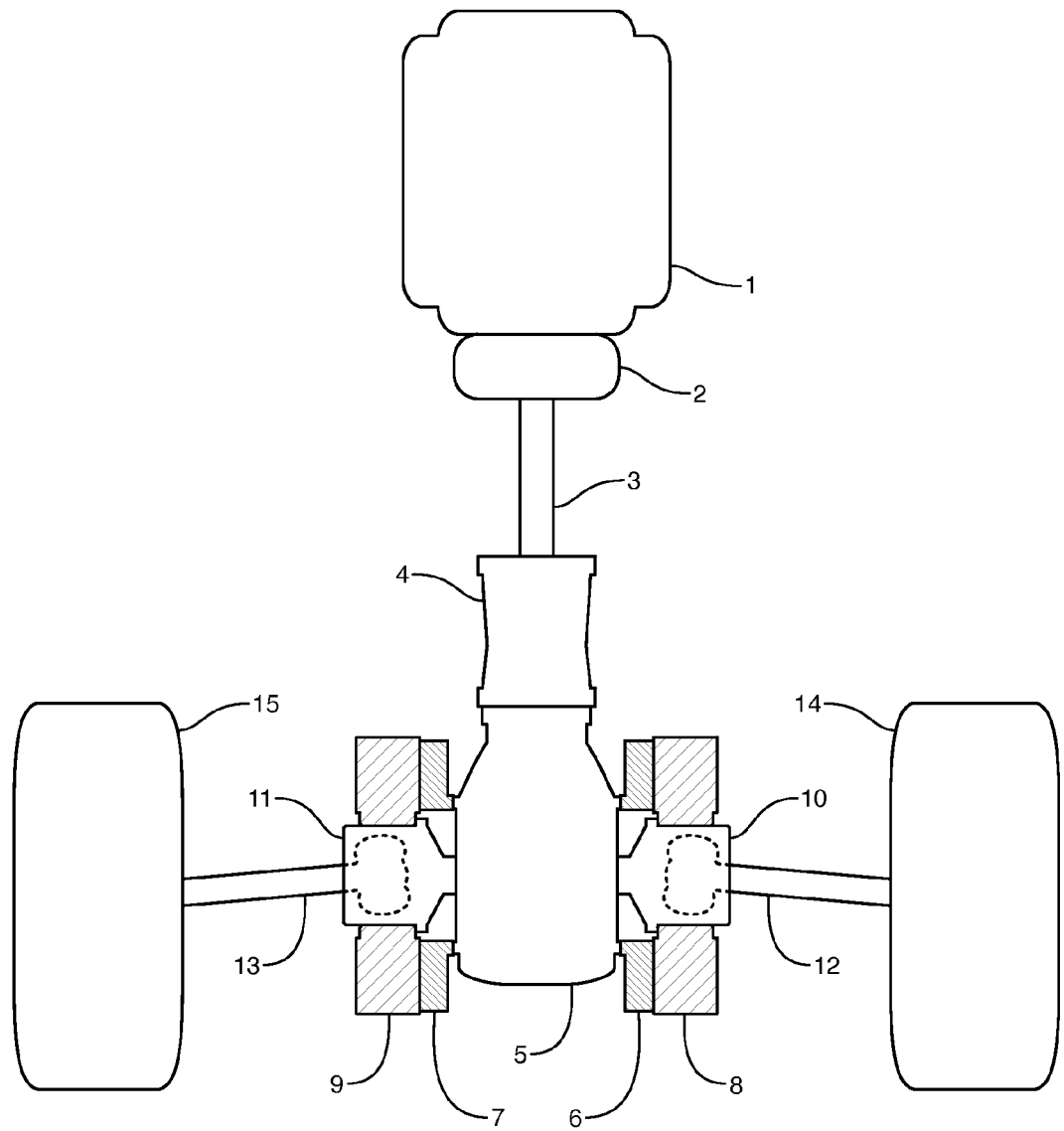
FIG. 1A is a schematic diagram of an exemplary vehicle hybrid drive arrangement implemented in a front-engine, rear-wheel drive vehicle.

The term "primary power source" refers to the vehicle's main energy supplying device that adds kinetic energy to the drivetrain used for turning a main power transmitting shaft. An example of a primary power source is an internal combustion engine.

The term "secondary power source" refers to a device that adds kinetic energy to the drivetrain between the vehicle's differential and an axle rotating a drive wheel. In an exemplary embodiment, the secondary power source may comprise an electric motor, preferably an axial flux traction motor. As used herein to refer to specific types of secondary power sources, the term "electric motor/generator" refers to an electric motor configured to withdraw kinetic energy from the drivetrain for storage when operated as a generator.

The term "power transmitting shaft" refers to member, such as a driveshaft or a torque tube, that transmits kinetic energy from the primary power source to subsequent components of the powertrain.

The term "primary power source engaging device" refers to a device for engaging and disengaging the primary power source from the powertrain, such as but not limited to a clutch or a torque converter.

The term "articulated axle shaft" as used herein, refers to a shaft between the wheel and the differential, sometimes also referred to as a "half shaft" by those of skill in the art, having couplings on both ends of the shaft that allow vertical movement (in a "Y" direction perpendicular to the ground on which the vehicle is traveling) and horizontal movement (in an X direction in the direction of forward or reverse movement of the vehicle) of the shaft and the wheel to which the shaft is attached. These axle shafts typically move as part of an independent suspension, such as may be constrained by control arms, strut rods and sway bar, as is well known in the art.

The term "differential output shaft" refers to one of two short side shafts connected to the differential gears within a differential, typically accessible through the sides of the differential.

The term "constant velocity joint," commonly known in the art as a "CV joint," refers to a joint that allows a drive shaft to transmit power through a variable angle, at constant rotational speed, without an appreciable increase in friction or play. The term "constant velocity joint coupling device" refers to a constant velocity joint bearing and a housing capable of receiving that bearing that couples the differential output shaft and the articulated axle shaft to the secondary power source, such to the electric motor rotor.

The term "differential case mounting device" refers to a structure configured to mount the secondary power sources to the differential case. In some instances the differential case mounting devices replace the side covers of the differential case. In some instances the differential case mounting device is fastened to the vehicle cross member support system to support components of the vehicle hybrid drive arrangement.

The term "battery system" refers to an energy storage device (such as but not limited to one or more batteries or supercapacitors), contactors, and a battery management system.

The term "electric motor controller" refers to a device that facilitates delivery of energy from the battery system to the electric motor for control of speed and acceleration. The electric motor controller may also convert direct current to alternating current in embodiments using alternating current electric motors.

The term "vehicle sensing and control system" refers to an electronic control module, preferably a programmable electronic control module, configured to monitor signals from other vehicle electronic control modules and/or from vehicle sensors and from the battery system, and further configured to provide control instructions to the electric motor controllers, the battery system, and/or the electric motor cooling system. The electric motor controllers and the vehicle sensing and control system may comprise any type of suitable electronics known in the art, and may comprise portions of a single integrated system.

The term "battery management system" refers to an electronic system configured to monitor and supervise the charging, discharging, and balancing of battery cells to facilitate battery operation within a desired operating range.

The term "contactor" refers to an electrically controlled switch wherein a first control circuit, typically a low voltage control circuit, switches on or off a second circuit, typically a high voltage circuit. In an exemplary embodiment, when a contactor is "closed", current is allowed to flow in the high voltage circuit.

One aspects of the current invention relates to a drive arrangement in which, in one embodiment, a first and a second electric traction motor, such as axial flux traction motors, are incorporated into the drivetrain of the vehicle, such as an internal-combustion-engine-powered two- or four-wheel drive vehicle, in which the conventional axles pass through the electric traction motors and are independently assisted by the electric traction motors, in a compact package, with an independent suspension, resulting in a high performance, hybrid electric vehicle. In preferred embodiments, the arrangement allows for the motors to operate in a range of high efficiency, allowing them to be used to supplement the internal combustion engine motive force at points in the drive cycle where the electric traction motors can most benefit the performance of the vehicle. The electric traction motors may be operated independently or in conjunction with the internal combustion engine drive to enhance the performance of the vehicle. In preferred embodiments, the vehicle hybrid drive arrangement avoids additional frictional drivetrain losses that would be associated with electric motor gearing and transmissions that would otherwise couple the electric motors to the drivetrain. Further, preferred embodiment comprising a drive arrangement with independent electric traction motors on each axle, allows for improved turning performance, as the motors can be driven at different rates, enhancing the corning performance of the vehicle. Thus, in preferred embodiments, the invention features fewer moving parts, lower frictional losses, lower weight, improved corning performance, faster acceleration and a more efficient drive cycle than in conventional vehicle or alternative hybrid designs.

In preferred embodiments, the drive arrangement allows the electric traction motors to be operated as generators, recovering and storing energy through the drive cycle. The drive arrangement turns the rotor portion of the electric motor constantly as the wheels are turning. The arrangement allows for the motors to operate to recover energy and to provide independent braking on the drive wheels at points in the drive cycle where the electric traction motors/generators can most benefit the performance of the vehicle.

Another aspect of the invention comprises a kit for retrofitting existing conventional internal combustion powered motor vehicles, converting these vehicles into hybrid electric vehicles. In preferred embodiments, the arrangement is compact and is incorporated into an independent suspension, allowing ease of incorporation into existing vehicle designs.

In embodiments in which a pure electric vehicle is desired, an electric motor can be substituted for the primary power source. In other embodiments, such as in embodiments in which electric motors are not desired, the secondary power sources may comprise compact turbine engines.

Direct drive axial flux motors are ideally suited for incorporation as part of the vehicle hybrid drive arrangement as the secondary power sources. Axial flux motors provide high energy density resulting in a compact arrangement. Embodiments comprising electric motor/generators as the secondary power sources, also preferably comprise a vehicle sensing and control system, a battery system and electric motor controllers. As is well known in the art, contemporary vehicles typically contain sensors that monitor a variety of vehicle functions, including but not limited to, for example, accelerator pedal position, brake pedal engagement, clutch pedal engagement, wheel speed, transmission gear selection, and steering wheel position. Such contemporary vehicles typically have a vehicle control module, for example an engine control module, that processes these inputs and control basic functions such as engine speed. The vehicle hybrid drive arrangement describe herein, when incorporating electric motors as the secondary power sources, may therefore comprise an additional control system, namely a vehicle sensing and control system to sense various vehicle functions and conditions. In addition, an electrical power system, such as a battery system containing a battery pack or supercapacitor pack containing one or more supercapacitors, provides energy to the electric motors and stores energy generated. In this instance the vehicle sensing and control system monitors primary vehicle control modules and provides inputs to the motor controllers that control the electric motors according to an algorithm developed for the vehicle hybrid drive arrangement. The development of algorithms for controlling vehicle functions, such as wheel axle and braking functions, are well known in the art. Accordingly, the inventions described herein are not limited to any particular algorithms for controlling the vehicle hybrid drive arrangements described herein and such algorithms may comprise any configuration acceptable for achieving the desired performance characteristics.

Older design vehicles may not possess vehicle control modules and sensors. Accordingly, retrofitting such older design vehicles may further include installation of sensors to monitor a variety of vehicle functions, including but not limited to, for example, accelerator pedal position, brake pedal engagement, clutch pedal engagement, wheel speed, transmission gear selection, and steering wheel position. In this such retrofit embodiments, the vehicle sensing and control system monitor these inputs and controls the electric motor/generators through the electric motor controllers according to an algorithm developed for the vehicle hybrid drive arrangement. As noted above, such algorithms are not limited to any particular configuration, may comprise any configuration acceptable for achieving desired performance.

Conventional single motor vehicles, such as those with a single internal combustion engine, generally do not allow for independent control of the drive wheels on the left and right side of the vehicle. Embodiments of the hybrid drive arrangement of the present invention, however, provides independent control of power to the left-side and right-side drive wheels, allowing independent supplementation of the primary power to right and left drive wheels.

Further, exemplary hybrid drive arrangements as described herein permit biasing power application to improve turning or cornering performance, enabling a vehicle to take bends or corners in a road at speed. In this instance, when turning left, the right secondary power source can be driven at a higher power than the left secondary power source, causing the vehicle to move left more effectively. Similarly when turning right, the left secondary power source can be driven at a higher power than the right secondary power source, causing the vehicle to move right more effectively.

Exemplary hybrid drive arrangements comprise electric motors that can be operated as generators to recover and store energy in an energy storage system, such as a battery system containing one or more batteries or supercapacitors. Energy extraction can be performed at a low rate, if desired, in a way that is not significantly perceptible by the driver. In this manner the primary power source, most often an internal combustion engine, can effectively be used to recharge the battery system so that electrical energy is available to power the secondary power source electric motors at another point in the drive cycle.

Energy extraction can also be performed at a high rate if desired. In this instance, energy extraction is significant and helps reduce the speed of the vehicle, often called regenerative braking. The drive axle is slowed as the rotor is slowed through inducing current in the motor/generator windings as they pass over the opposing poles in the permanent magnets. In this instance, significant power can effectively be extracted to recharge the energy storage system so that electrical energy is available at another point in the drive cycle. The vehicle sensing and control system can be programmed to extract energy during braking to slow the vehicle. The vehicle sensing and control system can be programmed to extract energy during hill decent to maintain vehicle speed without frictional braking. In this instance a vehicle attitude sensor is utilized to instruct the vehicle sensing and control system that the vehicle is descending a hill.

Embodiments of the hybrid drive arrangement may permit biasing energy recovery by biasing regenerative braking in order to improve turning or cornering performance. In this instance when turning left, the left secondary power source can extract power, slowing the left wheel, causing the vehicle to move left more effectively. Similarly when turning right, the right secondary power source can extract power, causing the vehicle to move right more effectively.

Preferred embodiments of the hybrid drive arrangement incorporate direct drive electric motors, which eliminate the need for additional mechanical clutches or gears. The motors are engaged electrically to supplement power or to extract power from the driveline without the need for mechanical mechanisms to engage the motors and without mechanical reduction gearing. This eliminates frictional losses associated with mechanical clutches and gears, reduces vehicle part count, and simplifies the vehicle design.

Figure 2A:
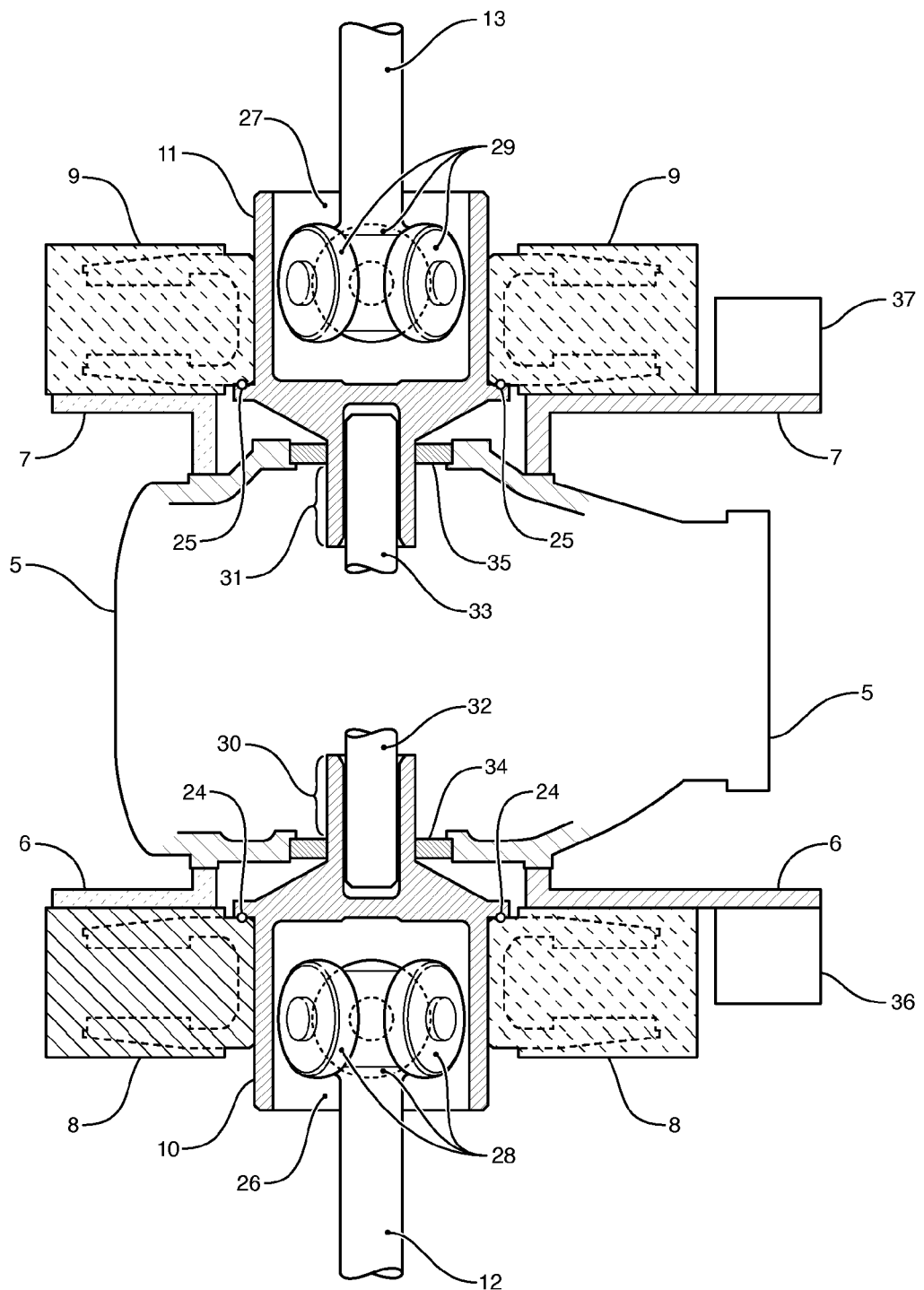
FIG. 2A is a section view of a various elements of an exemplary embodiment of the invention, depicting the differential, electric traction motors, and constant velocity joint coupling devices, depicting a first exemplary seal arrangement.
Figure 2B:
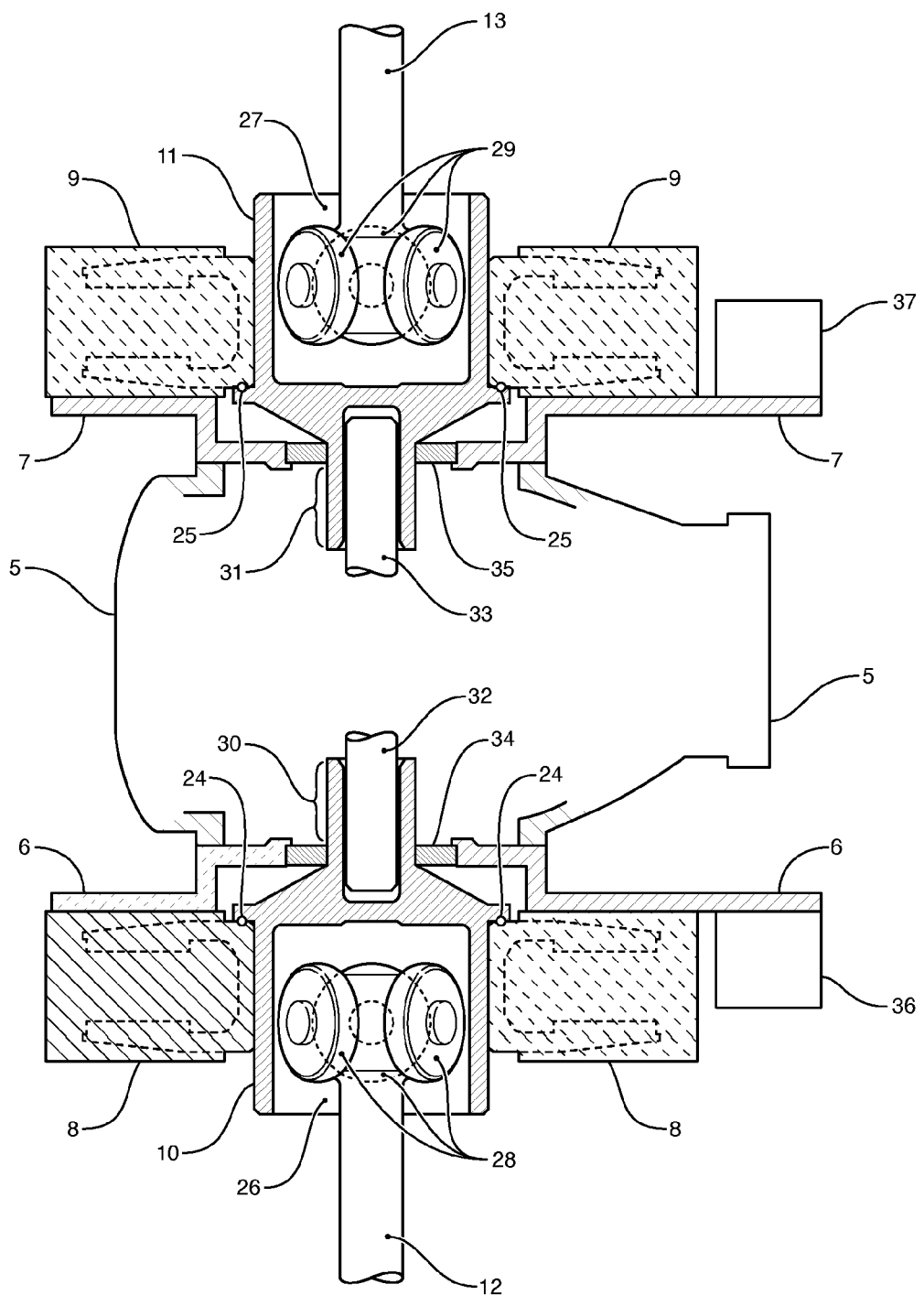
FIG. 2B is a section view of a various elements of an exemplary embodiment of the invention, depicting the differential, electric traction motors, and constant velocity joint coupling devices, depicting a second exemplary seal arrangement.

In some embodiments of the hybrid drive arrangement, the electric traction motor may mount into the side of the differential case, or side covers of the differential may be replaced with new differential case side covers comprising differential case mounting devices that mount to the differential case directly, as further detailed herein. No independent support structure may be necessary for the motors in some such embodiments. In some embodiments, the differential seals may remain in the differential in their normal configuration with the differential case mounting devices surrounding them, as shown in FIG. 2A. In other embodiments, the seals may be incorporated into the differential case mounting devices, as shown in FIG. 2B. The differential case mounting devices typically comprise bolting points for attaching the electric motors to the differential case mounting device and a mounting point for attaching the differential case mounting devices the to the rear cross member support of the vehicle to provide further support. For example, differentials may be supported in various fashions depending on the design of the vehicle. In some instances, the differential may be bolted to and supported from the top of the differential by an overhead cross member support that spans between frame rails of the vehicle. This configuration is used, for example, in second, third and fourth generation CHEVROLET® CORVETTE® vehicles. In other instances, the differential may be bolted to and supported from beneath with a cross member support that spans between the frame rails. In still other instances the transmission is connected to the differential and both are supported from beneath with a cross member that spans between the frame rails. This configuration is used, for example, in fifth, sixth, and seventh generation CHEVROLET® CORVETTE® vehicles. The vehicle hybrid drive arrangements described herein are compatible with any of the above methods of support, as well as any other methods of support.

One aspect of the hybrid drive arrangement comprises the incorporation of a constant velocity joint coupling device into the central axis of the electric motor, providing for a compact arrangement and ease of coupling to the left or right differential output shaft as well as to the respective left or right rear wheel axle drive shaft. A constant velocity joint allows for axle shaft rotation and axle shaft articulation. In one aspect the constant velocity joint coupling device comprises a constant velocity joint housing capable of receiving a tripod bearing, which has 3 rotational bearings that allow for horizontal movement of the articulated axle shaft. The invention is not limited to any particular type of constant velocity joint, however. The coupling device's constant velocity joint housing has provision for attachment to the electric motor rotor or is incorporated into the electric motor rotor. The coupling device's constant velocity joint housing also has an internally splined shaft extending inward into the differential for coupling to an externally splined differential output shaft, whereas externally splined differential output shafts are often contained within the differential housing. The provision for axial movement of the constant velocity joint within the central axis of the motor is beneficial because it greatly reduces the axial thrust that occurs due to wheel movement and right and left drive axle articulation that may otherwise damage the electric motor due to axial movement of the rotor and potential collision with the stator or electric motor internals. Further, the constant velocity joint coupling device allows for ease of assembly of the motor to the differential and of the right and left articulated drive axles to the motors. The electric motors can simply be slid onto the differential output shafts and the constant velocity joint bearings can simply be slid into the housing of the constant velocity joint coupling device. A rubber boot secured with a band clamp is used to contain grease within the constant velocity joint coupling device. The constant velocity joint coupling device allows for close coupling of the electric motors/generators to the differential, which is beneficial for vehicle packaging and for limiting modification in retrofit situations.

In preferred embodiments, the secondary power sources may be operable independently or in conjunction with the primary power source. For example, the drive cycle may have instances in which peak acceleration performance or high speed corning performance is demanded of the vehicle. In these instances, it is beneficial to have the secondary power sources, such as electric traction motors, supplementing the power of the primary power source, such as an internal combustion engine. The drive cycle may also have instances in which peak fuel economy or low noise emission is demanded of the vehicle. In these instances it is beneficial to have the secondary power sources, such as electric traction motors, as the dominant or sole source of power for the vehicle. In instances where the electric traction motors are the dominant source of power, the internal combustion engine may be run only at idle. In instances in which the electric traction motors are the sole source of power, the internal combustion engine may be shut down while maintaining electric power to key engine drive accessories. Internal combustion engine idling or shutdown with secondary power source electric traction motors as the dominant source of power may be invoked, for example, at higher cruising speeds, in long downhill stretches of the roadway, in stop and go low-speed traffic situations, or in parking situations.

Embodiments of the vehicle hybrid drive arrangement may be integrated into an independent suspension of the vehicle. The constant velocity joint coupling device integrated into the left and right electric traction motors provides for use of independent articulated axles, resulting in improved vehicle performance over irregular road surfaces.

Embodiments of the vehicle hybrid drive arrangement may in one aspect provide for operation of a vehicle with a manual transmission in a mode in which the transmission can be placed in a high gear and operated while the internal combustion engine is at low rpm and the vehicle is at low to moderate vehicle speeds without stalling the internal combustion engine. The electric motors acting as the secondary power source provide high torque at low revolutions per minute, providing for vehicle launch that would otherwise, under normal circumstances in the absence of the secondary electric motors, stall the internal combustion engine. This results in more efficient use of the internal combustion engine.

Embodiments of the vehicle hybrid drive arrangement may also, in one aspect, provide for matching the maximum capability, in revolutions per minute, of the right and left electric motors as secondary power sources, to the maximum desired revolutions per minute of the left and right drive axles, the left and right drive tires, and to the maximum desired vehicle speed. Matching the electric motor's performance capabilities to the maximum revolutions per minute of the drive wheels typically provides improved vehicle performance.

Embodiments of the vehicle hybrid drive arrangement in another aspect may provide for turning the vehicle's left drive wheels and right drive wheels in the same rotational direction, when viewed from the sides of the vehicle, to aid in low speed parking maneuvers. Under normal driving circumstances the right-side drive wheel turns clockwise as the vehicle moves forward when viewed from the right side of the vehicle. Under normal circumstances the left-side drive wheel turns counterclockwise as the vehicle moves forward when viewed from the left-side of the vehicle. For example, when a rear-wheel drive vehicle possessing the vehicle hybrid drive arrangement is in a tight spot in a parking lot or parking garage, and desires to turn sharply left while moving forward, it is beneficial to turn the right-side drive wheels clockwise, when viewing from the right side of the vehicle, and the left rear drive wheel clockwise, when viewing from the left side of the vehicle, while turning the steering wheel left. Similarly if the vehicle desires to turn sharply right while moving forward, it is beneficial to turn the right-side drive wheels counterclockwise, when viewing from the right side of the vehicle, and the left rear drive wheel counterclockwise, when viewing from the left side of the vehicle, while turning the steering wheel right. This feature, when used in conjunction with appropriate steering gears and differential gears, allows for pivoting the vehicle during parking or low speed maneuvers.

The vehicle hybrid drive arrangement, although described herein primarily in connection with an exemplary rear wheel drive vehicle embodiment, may also be applied to the front wheels of a four-wheel drive vehicle, or to a front-wheel drive vehicle. A differential case, often called a transfer case, contains a gear set driven by the primary power source. The gear set within the transfer case drives two transfer case output shafts which engage two independent, articulated axle shafts delivering power to drive the front wheels. The secondary power sources, in this instance, electric motors, are mounted between the transfer case output shafts and the articulated axle shafts. The secondary power sources incorporate a constant velocity joint coupling device within the central axis coupled to the transfer case output shaft and the constant velocity joint coupling devices are coupled to each secondary power source and drive the articulated axle shafts. In this way the front wheels of the vehicle can be driven by power from the primary power source and by power from the secondary power sources. Thus primary and secondary power sources can be used together or independently, depending on the desires of the operator or the position in the drive cycle. Further, the secondary power sources can be operated independently if desired.

Referring now to the Figures, one embodiment of the vehicle hybrid drive arrangement is shown in FIG. 1A. A primary power source, in this case an internal combustion engine, 1, is operated through a power-engaging device, for example a clutch, 2, and turns a power transmitting shaft, 3, and provides rotational energy to a transmission, 4, that modifies the rate of rotation to match the desired speed of the vehicle. The transmission, 4, turns an input shaft on the differential, 5, where the power is split and distributed to drive the wheels. Electric motors, 8 and 9 are mounted to the differential, 5, by differential case mounting devices, 6 and 7. Constant velocity joint coupling devices, 10 and 11, are coupled to the differential output shafts and are surrounded by, coupled to, and driven by the electric motors, 8 and 9. The constant velocity joint coupling device incorporates a housing that function as a receiver for the mechanical bearings of the constant velocity joint, such as a mechanical tripod arrangement. Articulated axle shafts, 12 and 13, are coupled to the drive wheels, 14 and 15, and to the constant velocity joint coupling devices, 10 and 11. The constant velocity joint coupling devices, 10 and 12, allows transmission of power from the internal combustion engine, 1, and the electric motors, 8 and 9, to the wheels.

Figure 1B:
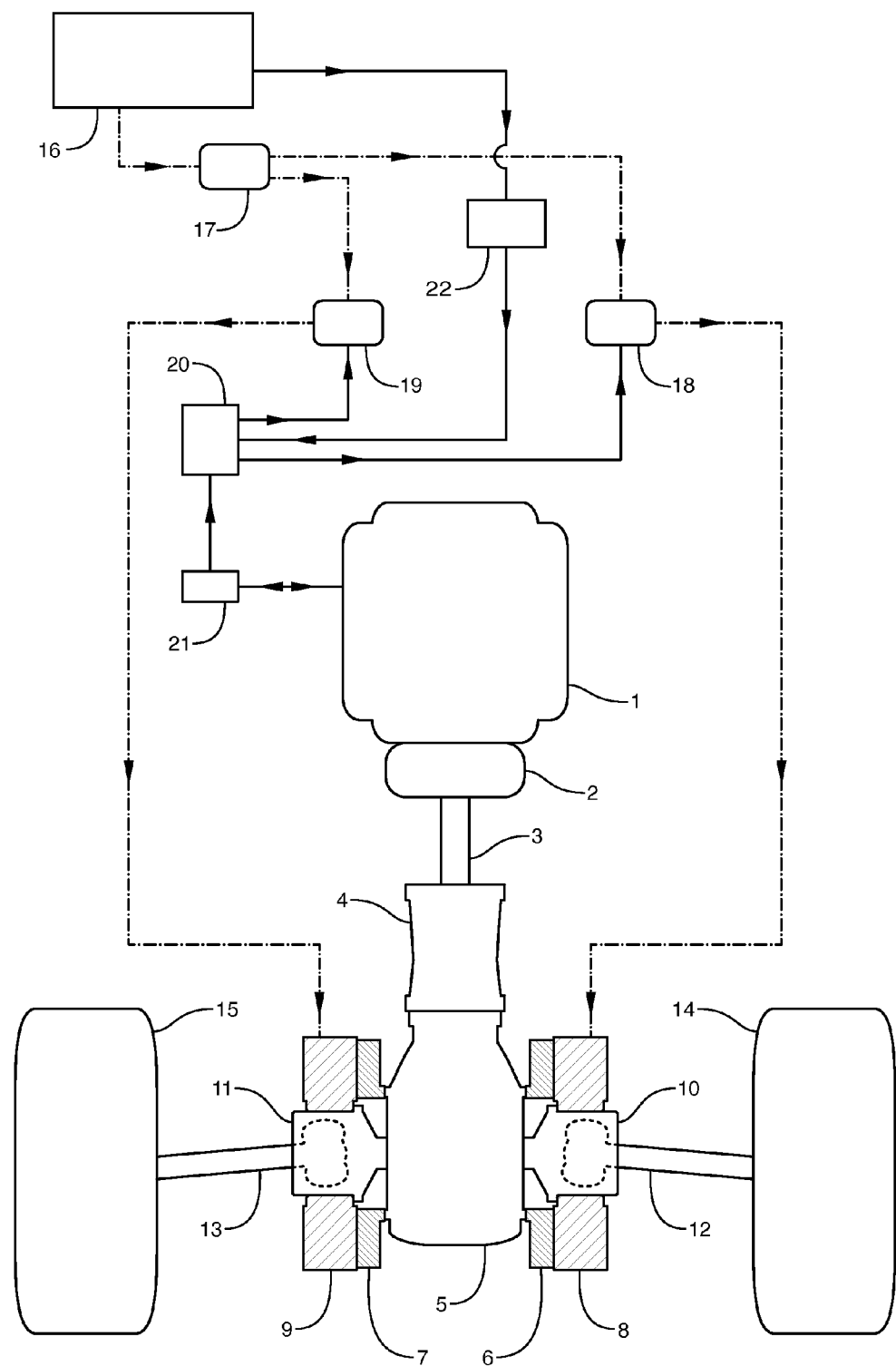
FIG. 1B is a schematic diagram of an exemplary vehicle hybrid drive arrangement in a power application mode implemented in a front-engine, rear-wheel drive vehicle with a battery system, two electric traction motor controllers, and a vehicle sensing and control system.

FIG. 1B. is a schematic diagram of an embodiment of the vehicle hybrid drive arrangement in the power application mode as implemented in a front-engine, rear-wheel drive vehicle with the battery system, two electric traction motor controllers, and the vehicle sensing and control system shown. In the power application mode, electrical energy is applied to the electric motors, 8 and 9, to aid in driving the wheels. A battery pack, 16, is connected through contactors, 17, to electric motor controllers, 18 and 19. The contractors, 17, are in a closed state allowing power to flow to the motor controllers, 18 and 19, when it is anticipated that the secondary power source electric motors are to be in operation. The vehicle sensing and control system, 20, gathers data from the vehicle control module, 21, and utilizes those data in an algorithm to provide instructions to electric motor controllers, 18 and 19. It should be understood that although shown as separate, discrete controllers, the controllers may comprise separate control circuits housed within a common housing with each other and/or with one or more elements of the vehicle sensing and control system. The vehicle control module, 21, can be an existing component of the motor vehicle, or an added component of the vehicle. The vehicle control module gathers information from a variety of sensors including accelerator pedal position, brake and clutch pedal engagement, vehicle velocity, transmission gear selection, and steering wheel position. A battery management system, 22, senses and reports information regarding the state of battery charge and discharge rate or recharge rate to the vehicle sensing and control system, 20. When the vehicle sensing and control system, 20, senses engagement and demand for supplemental power, a demand signal is sent to electric motor controllers, 18 and 19, which then provide power in proportion to the demand to electric motors, 8 and 9, from the battery pack, 16.

Figure 1C:
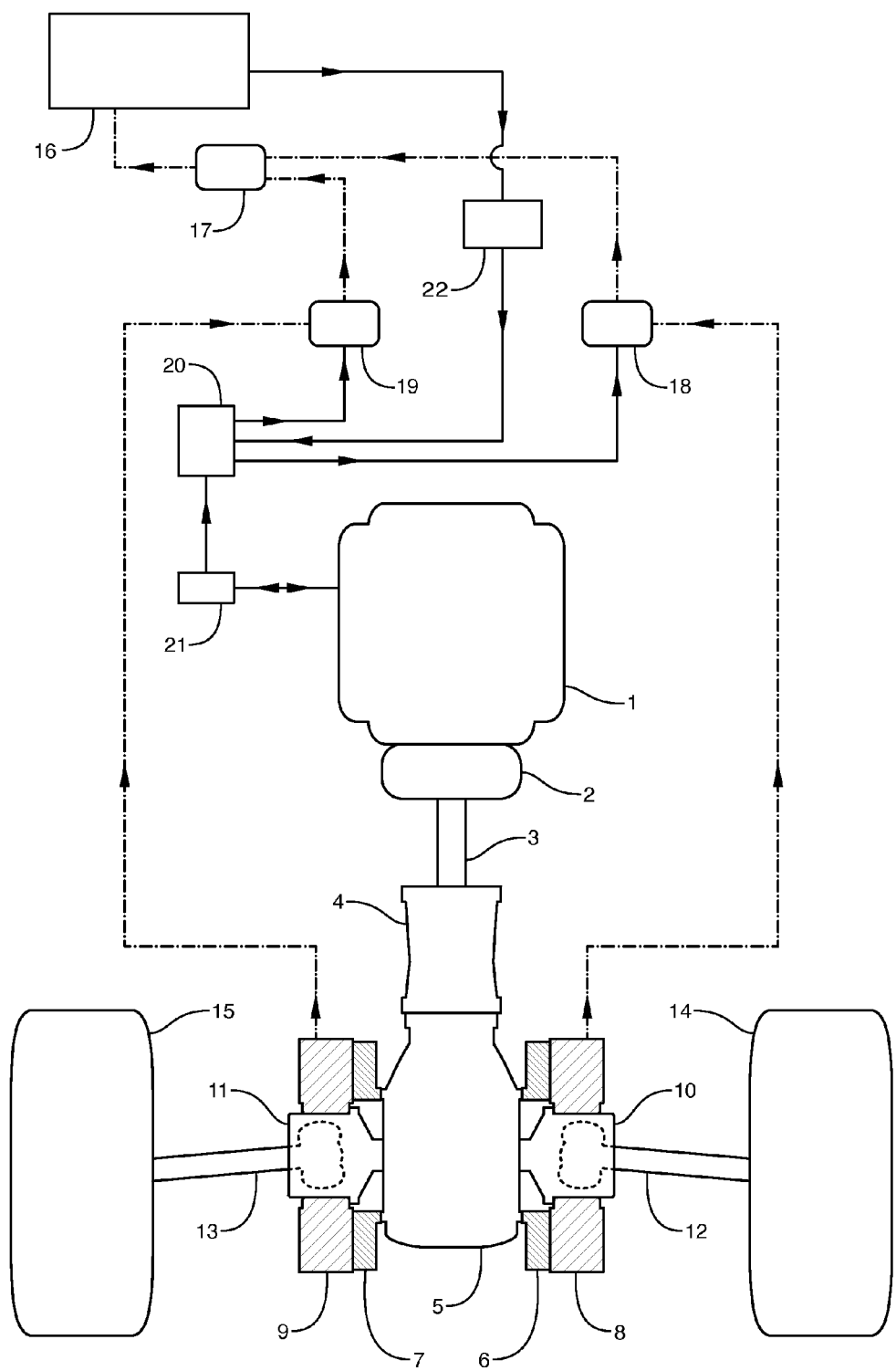
FIG. 1C is a schematic diagram of an exemplary vehicle hybrid drive arrangement in an energy recovery mode implemented in a front-engine, rear-wheel drive vehicle with a battery system, two electric traction motor controllers, and a vehicle sensing and control system.

For recovery of energy from the internal combustion engine or from the kinetic energy of the moving vehicle, the system can be operated in the manner described in conjunction with FIG. 1C. The electric motors, 8 and 9, can be operated as generators where the wheels, 14 and 15, turn the articulated axle shafts, 12 and 13, which turn the constant velocity joint coupling devices, 10 and 11, which turn the rotors in the motors resulting in an electric charge being generated. The charge is extracted when an appropriate command is sent from the vehicle sensing and control system, 20, to the electric motor controllers, 18 and 19, which extracts power from the electric motors/generators, 8 and 9, and stores it in the battery pack, 16. Extraction of energy can be done at low power levels if so commanded by the vehicle sensing and control system, 20. At higher power withdraw levels, the vehicle hybrid drive arrangement can be used to induce additional braking to the vehicle. In these instances the internal combustion engine 1, may be at idle. The electric motors, 8 and 9, are operated as generators and an appropriate signal is sent from the vehicle sensing and control system, 20, to the motor controllers, 18 and 19. This reduces the rotation of the constant velocity joint coupling devices, 10 and 11, which in turn slows the rotation of the articulated axle shafts, 12 and 13, which in turn slows the rotation of the wheels, 14 and 15, effectively slowing the vehicle. Regenerative braking in this manner extracts power from the electric generators, 8 and 9, and stores it in the battery pack, 16. A battery management system, 22, monitors and balances the charge state of the battery and provides battery status information to the vehicle sensing and control system, 20. The vehicle control module, 21, provides internal combustion engine and vehicle sensor information to the vehicle sensing and control system, 20.

A section view of embodiments of the vehicle hybrid drive arrangement are shown in FIGS. 2A and 2B. Both embodiments incorporate right-side, 8, and left-side, 9, axial flux electric motors surrounding the central axis right-side constant velocity joint coupling device, 10, and the left-side central axis constant velocity joint coupling device, 11. The right-side constant velocity joint coupling device, 10, is attached to the right-side electric motor rotor, 24, and the left-side constant velocity joint coupling device, 11, is attached to the left-side electric motor rotor, 25. In one aspect the constant velocity joint coupling device comprises a right-side constant-velocity joint housing, 26, and a left-side constant velocity joint housing, 27, capable of receiving tripod bearings, 28 and 29, each which have 3 rotational bearings that allow for limited axial movement of the articulated right-side shaft, 12, and the articulated left-side shaft, 13, as the shafts rotate and move in multiple dimensions. The outermost portion of the left-side articulated axle shaft connects to the left-side drive wheel (not shown in FIG. 2A or 2B) and the outer-most portion of the right-side articulated shaft connects to the right-side drive wheel (not shown in FIG. 2A or 2B). The inner-most portion of the right-side constant velocity joint coupling device has an internally splined shaft, 30, which slips over the differential's right-side externally splined output shaft, 32. Similarly the inner-most portion of the left-side constant velocity joint coupling device has an internally splined shaft, 31, which slips over and the differential's left-side externally splined output shaft, 33. A right-side differential case mounting device, 6, connects the right-side electric motor, 8, to the right side of the differential housing, 5, using appropriate fasteners. A right-side shaft seal, 34 (located in the center of the right-side differential case mounting device, 6, in the embodiment depicted in FIG. 2B, or located in the differential housing 5 in the embodiment depicted in FIG. 2A), retains the gear lubricant in the differential. A left-side differential case mounting device, 7, connects the left-side electric motor, 9, to the left side of the differential housing, 5, using appropriate fasteners. A left-side shaft seal, 35 (located in the center of the left-side differential case mounting device in the embodiment depicted in FIG. 2B, or located in differential housing 5 in the embodiment depicted in FIG. 2A) retains the gear lubricant in the differential. A right-side mounting device, 36, attached to the right-side differential case mounting device, 6, supports the aforementioned components of the vehicle hybrid drive arrangement and is fastened to the vehicle's cross member support system. A left-side mounting device, 37, attached to the left-side differential case mounting device, 7, also supports the aforementioned components of the vehicle hybrid drive arrangement and is fastened to the vehicle cross member support system.

FIG. 1B. can be used to illustrate how the vehicle hybrid drive arrangement can be used to assist in steering the vehicle and to provide enhanced cornering ability. While the vehicle is in forward motion, vehicle speed and steering wheel angle position are read from the vehicle control module, 21, and that information is provided to the vehicle sensing and control system, 20. The vehicle sensing and control system, 20, then provides a positive torque command to one of the electric motors, depending on the direction the operator of the vehicle desires to turn. If turning right, the vehicle sensing and control system, 20, provides a positive torque signal to left-side motor controller, 19, which provides torque to electric motor, 9, selectively turning the constant velocity joint coupling device, 11, which in turn increase the rotation of the articulated axle shafts, 13, which in turn increases the rotation rate of the left-side wheel 15, increasing the cornering ability of the vehicle. Additional enhancement can be gained through selectively slowing the right-side wheel, 14. The vehicle sensing and control system, 20, provides a braking signal to the right-side motor controller, 18, which couples the rotors in the electric generator, 8. This reduces the rotation of the constant velocity joint coupling device, 10, which in turn slows the rotation of the articulated axle shaft, 12, which in turn slows the rotation of the right-side wheel, effectively, increasing the cornering ability of the vehicle.

If turning left, the vehicle sensing and control system, 20, provides a positive torque signal to right-side motor controller, 18, which provides torque to electric motor, 8, selectively turning the constant velocity joint coupling device, 10, which in turn increase the rotation of the articulated axle shaft, 12, which in turn increases the rotation rate of the right-side wheel 14, increasing the cornering ability of the vehicle. Additional enhancement can be gained through selectively slowing the left-side wheel, 15. The vehicle sensing and control system, 20, provides a braking signal to the right motor controller, 19, which couples the rotors in the electric generator, 9. This reduces the rotation of the constant velocity joint coupling device, 11, which in turn slows the rotation of the articulated axle shaft, 13, which in turn slows the rotation of the left-side wheel, effectively, increasing the cornering ability of the vehicle.

FIG. 1B. can be used to illustrate how the vehicle hybrid drive arrangement can be used to assist in turning the vehicle at very low speeds and, in particular, in assisting to park the vehicle. A vehicle speed and a steering wheel angle position are read from the vehicle control module, 21, and are provided to the vehicle sensing and control system, 20. A park assist signal can be entered by the vehicle operator into the vehicle sensing and control system, 20. The vehicle sensing and control system, 20, then provides a positive torque command to one of the electric motors, depending on the direction of the turn. If moving forward and requiring a sharp right-hand turn, the vehicle sensing and control system, 20, provides a positive torque signal to left motor controller, 19, which provides torque to electric motor, 9, selectively turning the constant velocity joint coupling device, 11, which in turn increase the rotation of the articulated axle shaft, 13, which in turn increases the rotation rate of the left wheel 15, increasing the turning ability of the vehicle. Additional enhancement can be gained through reversing the rotation of the right hand wheel, 14. The vehicle sensing and control system, 20, provides a signal to reverse the right motor controller, 18, which couples the rotor in the electric motor, 8. This reverses the rotation of the constant velocity joint coupling device, 10, which in turn reverses the rotation of the articulated axle shaft, 12, which in turn reverses the rotation of the right-side wheel, 14, effectively pivoting the vehicle and providing enhanced parking ability.

If turning left while parking, the vehicle sensing and control system, 20, provides a positive torque signal to right-side motor controller, 18, which provides torque to electric motor, 8, selectively turning the constant velocity joint coupling device, 10, which in turn increase the rotation of the articulated axle shaft, 12, which in turn increases the rotation rate of the right-side wheel, 14, increasing the turning ability of the vehicle. Additional enhancement can be gained through selectively reversing the left-side wheel, 15. The vehicle sensing and control system, 20, provides a signal to the left-side motor controller, 19, which couples the rotor in the electric motor, 9. This reverses the rotation of the constant velocity joint coupling device, 11, which in turn reverses the rotation of the articulated axle shaft, 13, which in turn reverses the rotation of the left-side wheel, effectively pivoting the vehicle and providing enhanced parking ability.

FIG. 1B. can be used to illustrate how the vehicle hybrid drive arrangement can be used to aid in the drivability of a manual transmission vehicle, reducing the need to shift the vehicle. The need to significantly increase the revolutions per minute of the primary power source, in this case the internal combustion engine, in order to launch the vehicle is reduced. The driver selects a high gear using transmission, 4. Vehicle control module, 21, senses the vehicle gear selection, low vehicle speed, and increased accelerator pedal position and provides a signal to vehicle sensing and control system, 20, which in turn, activates the motor controllers, 18 and 19, which energize the electric motors, 8 and 9, providing high torque to constant velocity joint coupling devices, 10 and 11, which induces rotation of the articulated axle shafts, 12 and 13, which effectively rotates the wheels, 14 and 15. Movement of the vehicle is readily induced, even in high gear with low internal combustion engine revolutions per minute, whereby the vehicle under conventional power would not move and/or would stall the internal combustion engine.

The embodiments depicted and described herein have advantages as compared to hybrid designs comprising an electric motor integrated into the existing drivetrain prior to the vehicle's rear differential. Such an arrangement lacks the performance enhancements associated with driving each wheel at a different rate during cornering to enhance steering, or to brake or retard the wheels at different rates, as featured in preferred embodiments of the invention. Similarly, the embodiments depicted and described herein have advantages over designs that comprise clutches, gearing and/or a transmission between the electric motor and the conventional drivetrain, which would add weight and complexity, increase vehicle weight, and would not necessarily provide for efficient energy generation, recovery, and storage. Further, space limitations often preclude integration of conventional electric motors into existing vehicles or existing motor vehicle designs without extensive redesign.

EXAMPLE

In certain embodiments, the compact nature of the vehicle hybrid drive arrangement enables retrofitting existing vehicles with limited modifications. In one exemplary embodiment, the vehicle hybrid drive arrangement was installed as a kit in a sixth generation ("C6") CHEVROLET® CORVETTE® Z06® vehicle. The sixth generation CHEVROLET® CORVETTE® Z06® vehicle possesses a front-mounted internal combustion engine, rear-wheel drive arrangement, with an independent rear suspension. The exemplary CHEVROLET® CORVETTE® Z06® vehicle comprises a clutch, a torque tube, and a manual transmission in the driveline between the engine and the rear differential. The hybrid electric vehicle powertrain kit installed in this example comprised two electric axial flux traction motors/generators; two constant velocity joint coupling devices; two differential case mounting devices; a battery system; two traction motor controllers; and a vehicle sensing and control system. Axial flux electric traction motor cooling systems were incorporated into the vehicle to allow for the traction motors to operate with improved efficiency. Appropriate power cables, wires, electrical connectors, fasteners, and low voltage switches were also utilized.

The left and right inner constant velocity joints were removed from the differential. The rear transaxle cross member was removed from the attachment points on the rear frame rail and the differential was removed from the vehicle. The original side covers of the differential were removed and replaced with two differential case mounting devices of the hybrid electric vehicle powertrain kit. The differential case mounting devices provided support of the traction motors/generators by the differential case and alignment of the constant velocity joint coupling device with the externally splined differential output shafts within the existing differential. The differential case mounting device designs were somewhat different on the left side and the right side of the vehicle to accommodate unique features of the vehicle. The differential case mounting devices also supported the differential housing and transmission on the rear transaxle cross member. Specifically, as is known in the field, the C6 CORVETTE® stock rear cross member utilizes a transmission mount, namely an "H-shaped" rubber and steel isolation device with studs extending upward and downward in an "H" pattern. This transmission mount is disposed between the rear differential size covers and the rear cross member and is retained with four nuts. This mount supports both the differential and the transmission. This mount and how it attaches are well known to those of skill in the art and documented in various service manuals. The vehicle hybrid drive arrangement in this example utilized mounting devices secured in the stock transmission mounting slots of the 2009-2014 C6 CORVETTE® stock cross member support. These mounting devices, namely studs extending from the mounting devices down through the cross member support and retained with nuts, connected the rear cross member support to the vehicle hybrid drive arrangement differential case mounting devices.

The electric traction motors containing the constant velocity joint coupling devices were mounted to the differential case mounting devices by sliding the central internally splined shaft of the constant velocity joint coupling devices through seals in the differential case mounting devices and over the externally splined differential output shafts contained within the existing differential. The cases of the electric traction motors were then bolted to the differential case mounting devices. The rear transaxle cross member was utilized and slightly modified through material removal to accommodate the hybrid electric vehicle powertrain kit. The rear transaxle cross member was reinstalled onto the rear frame rails of the vehicle. The differential case mounting devices, supporting the transmission, differential and the left and right electric traction motors, were bolted to the rear transaxle cross member. Existing right and left rear articulated axle shafts were installed into the constant velocity joint coupling devices and sealed with rubber boots. A skid plate was added to the bottom of the rear transaxle cross member to provide for additional stiffening of the cross member and protection of the electric motors. The exemplary hybrid electric vehicle powertrain kit close-coupled the electric motors to the differential, eliminating the need for any modifications to the existing frame rails of the vehicle.

The battery system, electric motor controllers, and vehicle sensing and control system were securely mounted in the luggage storage area directly above the differential housing. The controllers were electrically connected to the electric motors/generators. The vehicle sensing and control system was connected to the existing vehicle control module. A closed-circuit coolant system was installed for each electric motor, with each system comprising a heat exchanger, a cooling fan, a fluid pump and hoses. The heat exchanger, the cooling fan and the pump were located in the brake duct area in front of the right and left rear wheels.

The hybrid electric vehicle powertrain kit as demonstrated in the specific current example may be configured for installation on many other makes, models, and years of motor vehicles, without limitation.

The invention is not limited to the embodiments described above, but encompasses any and all embodiments within the scope of the following claims.

What is claimed is:

1. A vehicle hybrid drive arrangement comprising:
   a primary power source;
   a primary power transmitting shaft;
   a transmission driven by the primary power source;
   a differential having a differential case and two differential output shafts;
   two independent, articulated axle shafts, each shaft configured to deliver power to a drive wheel;
   two secondary power sources comprising electric traction motor/generators, each disposed between one of the differential output shafts and one of the articulated axle shafts, each secondary power source comprising a constant velocity joint coupling device disposed within a central axis of the secondary power source and configured to couple the secondary power source to the corresponding differential output shaft and to drive the corresponding articulated axle shaft;
   a battery system connected to the electric traction motors/generators; and
   a vehicle sensing and control system configured to provide instructions to one or more motor/generator controllers configured to control the electric traction motors/generators.

2. The vehicle hybrid drive arrangement of claim 1, wherein the primary power source comprises an internal combustion engine.

3. The vehicle hybrid drive arrangement of claim 2, wherein the vehicle sensing and control system, the electric traction motors/generators, the motor/generator controllers, or a combination thereof are configured to operate the electric traction motors/generators independently or in conjunction with the internal combustion engine.

4. The vehicle hybrid drive arrangement of claim 1, wherein the arrangement is configured to supplement power to each drive wheel independently.

5. The vehicle hybrid drive arrangement of claim 1, wherein the vehicle sensing and control system, the secondary power source electric traction motors/generators, the motor/generator controllers, or a combination thereof are configured to operate the electric traction motors/generators as generators to recover energy from a moving vehicle and to store that energy in the battery system.

6. The vehicle hybrid drive arrangement of claim 1, wherein the vehicle sensing and control system, the electric traction motors/generators, the motor/generator controllers, or a combination thereof are configured to operate the electric traction motors/generators as generators to extract energy from the drive wheels to brake or slow a moving vehicle.

7. The vehicle hybrid drive arrangement of claim 1, wherein the secondary power sources are configured to supplement power to each drive wheel independently and to aid in turning the vehicle.

8. The vehicle hybrid drive arrangement of claim 1, wherein the vehicle sensing and control system, the electric traction motors/generators, the motor/generator controllers, or a combination thereof are configured to operate the electric traction motors/generators as generators to extract power from each drive wheel independently and to aid in turning the vehicle.

9. The vehicle hybrid drive arrangement of claim 1, wherein the vehicle hybrid drive arrangement is implemented into a front engine, rear-wheel drive vehicle.

10. The vehicle hybrid drive arrangement of claim 1, wherein the constant velocity joint coupling device comprises no mechanical clutches or gears.

11. The vehicle hybrid drive arrangement of claim 1, wherein the secondary power source electric traction motors/generators are mounted on the differential case.

12. The vehicle hybrid drive arrangement of claim 1, wherein each constant velocity joint coupling device is incorporated into a rotor of a corresponding secondary power source electric traction motor/generator.

13. The vehicle hybrid drive arrangement of claim 1, wherein the vehicle hybrid drive arrangement is integrated into an independent suspension of a vehicle.

14. A vehicle hybrid drive arrangement comprising:
   a primary power source, comprising an electric motor
   a primary power transmitting shaft;
   a transmission driven by the primary power source;
   a differential having a differential case and two differential output shafts;
   two independent, articulated axle shafts, each shaft configured to deliver power to a drive wheel;
   two secondary power sources, each disposed between one of the differential output shafts and one of the articulated axle shafts, each secondary power source comprising a constant velocity joint coupling device disposed within a central axis of the secondary power source and configured to couple the secondary power source to the corresponding differential output shaft and to drive the corresponding articulated axle shaft.

15. A vehicle hybrid drive arrangement comprising:
   a primary power source;
   a primary power transmitting shaft;
   a transmission driven by the primary power source;
   a differential having a differential case and two differential output shafts;
   two independent, articulated axle shafts, each shaft configured to deliver power to a drive wheel;
   two secondary power sources comprising direct drive axial flux electric motors/generators, each disposed between one of the differential output shafts and one of the articulated axle shafts, each secondary power source comprising a constant velocity joint coupling device disposed within a central axis of the secondary power source and configured to couple the secondary power source to the corresponding differential output shaft and to drive the corresponding articulated axle shaft.

16. A vehicle hybrid drive arrangement comprising:
   a primary power source comprising an internal combustion engine;
   a primary power transmitting shaft;
   a transmission driven by the primary power source;
   a differential having a differential case and two differential output shafts;
   two independent, articulated axle shafts, each shaft configured to deliver power to a drive wheel;
   two secondary power sources, each disposed between one of the differential output shafts and one of the articulated axle shafts, each secondary power source comprising a constant velocity joint coupling device disposed within a central axis of the secondary power source and configured to couple the secondary power source to the corresponding differential output shaft and to drive the corresponding articulated axle shaft; and a vehicle sensing and control system configured to provide instructions to one or more secondary power source controllers configured to control the secondary power sources;

wherein the vehicle sensing and control system, the one or more secondary power source controllers, the secondary power sources, or a combination thereof are configured to launch the vehicle without stalling the internal combustion engine while the transmission is in a relatively high gear and the internal combustion engine is operating at relatively low revolutions per minute, wherein the relatively low revolutions per minute is below a threshold value at which the internal combustion engine would stall in the relatively high gear without the assistance of the secondary power sources.

17. A vehicle hybrid drive arrangement comprising:
a primary power source;
a primary power transmitting shaft;
a transmission driven by the primary power source;
a differential having a differential case and two differential output shafts;
two independent, articulated axle shafts, each shaft configured to deliver power to a drive wheel;
two secondary power sources, each disposed between one of the differential output shafts and one of the articulated axle shafts, each secondary power source comprising a constant velocity joint coupling device disposed within a central axis of the secondary power source and configured to couple the secondary power source to the corresponding differential output shaft and to drive the corresponding articulated axle shaft; and
a vehicle sensing and control system configured to provide instructions to one or more secondary power source controllers configured to control the secondary power sources;
wherein the vehicle sensing and control system, the one or more secondary power source controllers, the secondary power sources, or a combination thereof are configured to operate in concert to pivot the vehicle at low speed to improve maneuverability to aid in parking and turning.

18. A hybrid electric vehicle powertrain kit for retrofitting an internal-combustion-engine-powered vehicle having a transmission, a differential having a differential case and two differential output shafts, and two independent, articulated axle shafts for delivering power from one of the differential output shafts to a drive wheel, the kit comprising:
two electric traction motors/generators, each comprising a constant velocity joint coupling device coupled thereto, each constant velocity joint coupling device configured to couple the corresponding electric traction motor/generator to a corresponding differential output shaft and a corresponding axle shaft;
two differential case mounting devices, each for mounting one of the electric traction motor/generators to one side of the differential case between the differential and one of the independent, articulated axle shafts;
a battery system electrically coupled to the two electric traction motors; and
a vehicle sensing and control system configured to provide instructions to at least two motor/generator controllers, each motor/generator controller configured for controlling one of the electric traction motor/generators.

19. The hybrid electric vehicle powertrain kit of claim 18, wherein the electric traction motors/generators comprise direct drive axial flux electric motors/generators.

20. The hybrid electric vehicle powertrain kit of claim 18, wherein the electric traction motors/generators are configured to supplement power to each drive wheel independently.

21. The hybrid electric vehicle powertrain kit of claim 18, wherein the vehicle sensing and control system, electric traction motors/generators, motor/generator controllers, or a combination thereof are configured to operate the electric traction motors/generators as generators to recover energy from a moving vehicle and store that energy in the battery system.

22. The hybrid electric vehicle powertrain kit of claim 18, wherein the vehicle sensing and control system, the electric traction motors/generators, the motor/generator controllers, or a combination thereof are configured to operate the electric traction motors/generators as generators to extract energy from the wheels to brake or slow a moving vehicle.

23. The hybrid electric vehicle powertrain kit of claim 18, wherein the vehicle sensing and control system, the electric traction motors/generators, the motor/generator controllers, or a combination thereof are configured to supplement power to each drive wheel independently and to aid in turning the vehicle.

24. The hybrid electric vehicle powertrain kit of claim 18, wherein the vehicle sensing and control system, the electric traction motors/generators, the motor/generator controllers, or a combination thereof are configured to operate the electric traction motors as generators to extract power from each drive wheel independently and to aid in turning the vehicle.

25. The hybrid electric vehicle powertrain kit of claim 18, wherein the kit is configured to be incorporated into an existing front engine, rear-wheel drive vehicle.

26. The hybrid electric vehicle powertrain kit of claim 18, wherein the vehicle sensing and control system, the electric traction motors/generators, the motor/generator controllers, or a combination thereof are configured to operate the electric traction motors/generators independently or in conjunction with the internal combustion engine.

27. The hybrid electric vehicle powertrain kit of claim 18, wherein the vehicle sensing and control system, the electric traction motors/generators, the motor/generator controllers, or a combination thereof are configured to launch the vehicle without stalling the internal combustion engine while the transmission is in a relatively high gear and the internal combustion engine is operating at relatively low revolutions per minute, wherein the relatively low revolutions per minute is below a threshold value at which the internal combustion engine would stall in the relatively high gear without the assistance of the secondary power sources.

\* \* \* \* \*